Patented Dec. 11, 1923.

1,477,478

UNITED STATES PATENT OFFICE.

JAMES ORR ELTON AND RUSSEL B. CAPLES, OF GREAT FALLS, MONTANA, ASSIGNORS TO ANACONDA COPPER MINING COMPANY, A CORPORATION OF MONTANA.

HYDROMETALLURGICAL TREATMENT OF ZINC ORE.

No Drawing.     Application filed April 15, 1921. Serial No. 461,589.

*To all whom it may concern:*

Be it known that we, (1) JAMES ORR ELTON and (2) RUSSEL B. CAPLES, citizens of the United States, residing at Great Falls, in the county of Cascade and State of Montana, have invented certain new and useful Improvements in Hydrometallurgical Treatment of Zinc Ores, of which the following is a specification.

This invention is an improvement in the hydrometallurgical treatment of zinc ores, and has for its object the recovery of zinc values remaining in the residues from such hydrometallurgical treatments.

In the roasting and leaching of zinc ores, especially those containing iron, using sulfuric acid as a solvent, some zinc remains undissolved in the leached residue. This zinc may be present as zinc sulfide or as a compound with iron, as ferrite or ferrate of zinc. There also remains in the residue some zinc in the form of zinc sulfate, the amount so present depending upon the amount of residue produced and the ease with which the residue may be washed free of entrained zinc sulfate solution, and the amount of water that can be added, as washing water.

The washing of the residue is affected by the amount of colloidal and gelatinous material in proportion to the amount of sandy material present. Ferric salts, gelatinous silica and aluminum hydroxide tend to make the residue impervious to the passage of washing solutions, thereby increasing the loss of soluble zinc as entrained solution.

It is one of the objects of this invention to prevent these losses of zinc as zinc sulfide, as ferrite or ferrate, and as zinc sulfate.

It is known that the zinc-iron compound known as ferrite or ferrate may be partially or completely decomposed by treating with strong hot solutions of sulfuric acid giving a solution containing zinc, iron and arsenic.

To remove the iron and arsenic from the solutions they must be oxidized and precipitated, but the resulting precipitate is difficultly filterable and hard to wash. Further, many zinc ores contain copper, a portion of which will remain undissolved in the leached residue after it has been treated with dilute sulfuric acid. If this residue is to be smelted in a lead blast-furnace, copper is an undesirable element. It is desirable, therefore, to remove, as far as possible, the copper content from the residue by getting it into solution from which it may be precipitated by known methods, the precipitate containing from 30 to 70 per cent or higher, by weight of copper, thereby obtaining a higher recovery of copper.

In many cases, also, the residue from hydrometallurgical plants treating zinc ores contains sufficient lead to make it a desirable material for a lead smelter. This is especially true if the zinc and copper contents are low or negligible. The removal of zinc and copper from such residues not only improves the nature of the residue as a lead blast-furnace material, but the weight of residue to be smelted is also reduced, thereby reducing the slag loss and cost of treatment.

In the roasting of zinc sulfide ores some water soluble sulfates are formed, and usually some zinc sulfide remains unroasted. Any water soluble sulfates remaining in the roasted ore or concentrate tend to increase the amount of sulfuric acid in the leaching system, either as free or combined acid, and if the leaching is followed by electrolysis of the resulting zinc sulfate solution for the recovery of zinc, the amount of acid soon reaches a point where some acid must be discarded from the system. This may be accomplished either by the addition of a material forming an insoluble sulfate, which results in increasing the amount of residue, or by discarding solution from which zinc has been partially removed. In either case, some zinc is lost, either as entrained solution in the residue or because it is difficult to economically remove all zinc from a sulfate solution by electrolysis.

It is therefore desirable to provide some means for discarding acid solutions without loss of zinc, and our process provides for discarding solutions of this character.

It is also desirable to recover any zinc present in the roasted calcine as zinc sulfide, and our process provides for such recovery.

Our improvement in general, therefore, comprises the treatment of the residue resulting from lixiviation or leaching roasted zinc-containing ores with dilute sulfuric acid in such manner as to increase the recovery of zinc and copper with the production of a final residue which may be more economically treated for the recovery of the remaining metal values than the original residue.

Our process is carried out as follows: The residue to be treated is mixed with sulfuric acid of any desired strength, but preferably at least 50% sulfuric acid is used. The mixture is then heated to a sufficient temperature to insure the decomposition of most of the iron sulfate and the dehydration of gelatinous compounds present, without decomposing the zinc sulfate formed,—approximately 600° C.

The amount of acid to be added to a given quantity of residue depends largely upon the zinc content thereof. We have found that from one and one-half (1½) to two (2) parts by weight of sulfuric acid to one (1) part by weight of zinc will give the maximum recovery of zinc.

The acid to be mixed with the residue may be that obtained from the electrolytic cells, as above referred to, or may be obtained from an outside source. If the acid supplied is obtained from the electrolytic cells, it is desirable to evaporate to the desired strength before mixing with the residue to be treated.

Losses of acid in the heating operation may be avoided or controlled by suitable apparatus such as the Cottrell treaters. As the result of this heating, a product is obtained in which a large percentage of the zinc, copper and cadmium present are soluble in water, but only a small part of the iron, arsenic, antimony, silica, alumina, etc., are present in forms soluble in water.

This product is then agitated preferably with water, or dilute acid if desired, and the resulting pulp allowed to settle in suitable apparatus. The thickened pulp is then filtered and is easily washed free of entrained solution due to the fact that the dehydration of the gelatinous ingredients by the heat treatment allows free passage of water or other washing solution.

From the filtrate thus obtained and the overflow from the settler are removed the copper, cadmium and any iron, arsenic or antimony that may be present, by known methods of purification, by which the copper and cadmium are recovered in such form as to be rich enough in these metals to be economically treated for their recovery.

The final residue from the filter contains practically all of the lead, silver and gold in the original residue and is a desirable product for a lead blast-furnace or for brine leaching.

We claim:

1. The method of treating the residues containing gelatinous material derived from the lixiviation of roasted zinc ores with dilute sulfuric acid which comprises mixing such residues with sulfuric acid, and heating the mixture to a temperature short of that at which zinc sulfate is decomposed and sufficient to insure the decomposition of most of the iron sulfate and the dehydration of gelatinous material.

2. The method of recovering zinc from ores which comprises roasting the ore and lixiviating the roasted ore with sulfuric acid whereby a solution containing zinc salt and a residue are produced, subjecting said solution to electrolysis for the recovery of zinc, mixing said residue with the solution resulting from the electrolysis and heating the mixture to a temperature short of that at which zinc sulfate is decomposed and sufficient to insure the decomposition of most of the iron sulfate and the dehydration of gelatinous compounds present.

In testimony whereof, we affix our signatures.

JAMES ORR ELTON.
RUSSEL B. CAPLES.